(12) United States Patent
Bauman et al.

(10) Patent No.: US 10,698,804 B1
(45) Date of Patent: Jun. 30, 2020

(54) IDENTIFYING INPUTS FOR AUTOMATED COMPUTER-PROGRAM TESTING OPERATIONS

(71) Applicant: FUJITSU LIMITED, Kawasaki-shi, Kanagawa (JP)

(72) Inventors: Erick Bauman, Richardson, TX (US); Praveen Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/259,909

(22) Filed: Jan. 28, 2019

(51) Int. Cl.
*G06F 9/44* (2018.01)
*G06F 11/36* (2006.01)
*G06F 11/28* (2006.01)

(52) U.S. Cl.
CPC .......... *G06F 11/3684* (2013.01); *G06F 11/28* (2013.01); *G06F 11/3636* (2013.01); *G06F 11/3664* (2013.01); *G06F 11/3688* (2013.01); *G06F 11/3692* (2013.01)

(58) Field of Classification Search
CPC ..... G11C 29/16; G06N 20/00; G06F 11/3612; G06F 21/577; G06F 11/3466; G06F 11/3636; G06F 2221/033; H04L 43/16
See application file for complete search history.

(56) References Cited

U.S. PATENT DOCUMENTS

| | | | | |
|---|---|---|---|---|
| 2005/0172180 | A1* | 8/2005 | Damodaran | G11C 29/16 714/723 |
| 2017/0270033 | A1* | 9/2017 | Aoki | G06F 21/577 |
| 2018/0365139 | A1* | 12/2018 | Rajpal | G06N 20/00 |
| 2019/0266071 | A1* | 8/2019 | Copty | G06F 11/3612 |

OTHER PUBLICATIONS

Bohme et al, "Coverage-based Greybox Fuzzing as Markov Chain", TSE, vol. XX, Dec. 2017, pp. 1-18 <Greybox_Bohme.pdf>.*
Wang Junjie, Detection and Analysis of Web-based Malware Vulnerability, SCSE, Nanyang University, 2018, pp. 1-172 <Junjie_2018.pdf>.*
Bohme et al. "Coverage-based Greybox Fuzzing as Markov Chain" CCS'I6, pp. 1032-1043, Oct. 24, 2016.
"american fuzzy lop (2.52b)" http://lcamtuf.coredump.cx/afl/, retrieved Jan. 28, 2019.
"Technical "whitepaper" for afl-fuzz" http://lcamtuf.coredump.cx/afl/technical_details.txt, retrieved Jan. 28, 2019.

* cited by examiner

*Primary Examiner* — Tuan A Vu
(74) *Attorney, Agent, or Firm* — Maschoff Brennan

(57) ABSTRACT

According to an aspect of an embodiment, a method of identifying inputs for automated computer-program testing operations may include obtaining a first input for a computer-readable program that is used during execution of the computer-readable program to cause the computer-readable program to take a first path during execution of the computer-readable program. The method may also include obtaining a second input for the computer-readable program that is used during execution of the computer-readable program to cause the computer-readable program to take a second path during execution of the computer-readable program. The method may also include identifying a sequence of values that is common to both the first input and the second input. The method may also include generating a third input that includes the sequence of values and a new value, the third input configured to be used during execution of the computer-readable program.

20 Claims, 8 Drawing Sheets

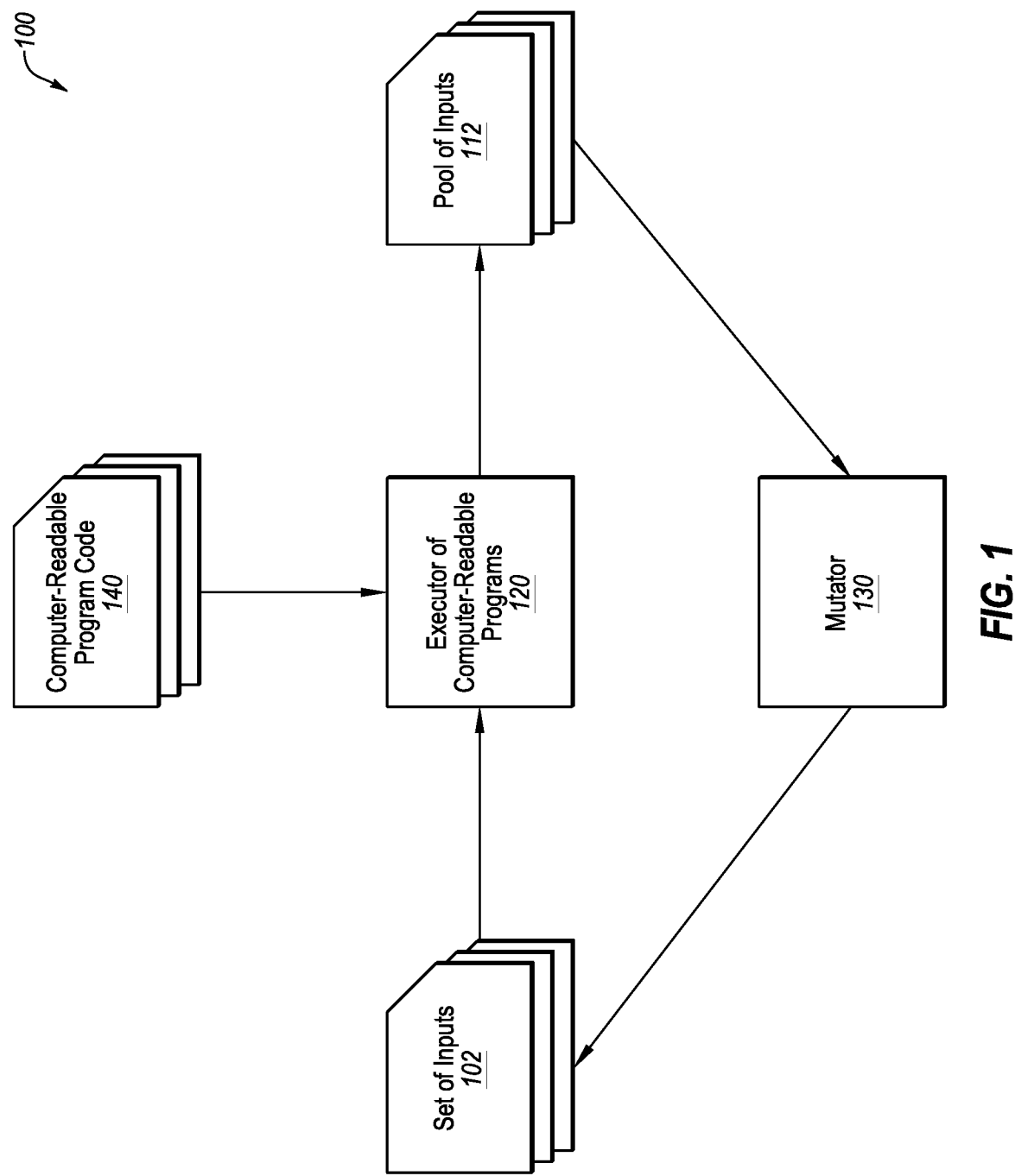

IDENTIFYING INPUTS FOR AUTOMATED COMPUTER-PROGRAM TESTING OPERATIONS

FIELD

The embodiments discussed in the present disclosure are related to identifying inputs for automated computer-program testing operations.

BACKGROUND

Computer programs are important in many industries. Computer program development, testing and/or debugging may benefit from tools that either aid or automate some aspects of computer-program testing and/or debugging.

SUMMARY

One embodiment of the present disclosure may include a method that includes obtaining a first input for a computer-readable program that is used during execution of the computer-readable program to cause the computer-readable program to take a first path during execution of the computer-readable program. The method may also include obtaining a second input for the computer-readable program that is used during execution of the computer-readable program to cause the computer-readable program to take a second path during execution of the computer-readable program. The method may also include identifying a sequence of values that is common to both the first input and the second input. The method may also include, based on the sequence of values being common to both the first input and the second input, generating a third input that includes the sequence of values and a new value, the third input configured to be used during execution of the computer-readable program.

Another embodiment of the present disclosure may include a method that includes obtaining a computer-readable program that includes a portion of code. The method may also include executing the computer-readable program using a first input. The method may also include tracking a number of executions of the portion of code during the execution of the computer-readable program using the first input. The method may also include comparing the number of executions of the portion of code to a highest previous number of executions of the portion of code when executing the computer-readable program. The method may also include, in response to the number of executions being greater than the highest previous number of executions, storing the number of executions as the highest previous number of executions. The method may also include, in response to the number of executions being greater than the highest previous number of executions, adding the first input to a first pool of inputs to be subject to mutating operations.

One or more of the objects and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings in which:

FIG. 1 is a block diagram of an example system for identifying inputs for automated computer-program testing operations;

DESCRIPTION OF EMBODIMENTS

Figure 2A:
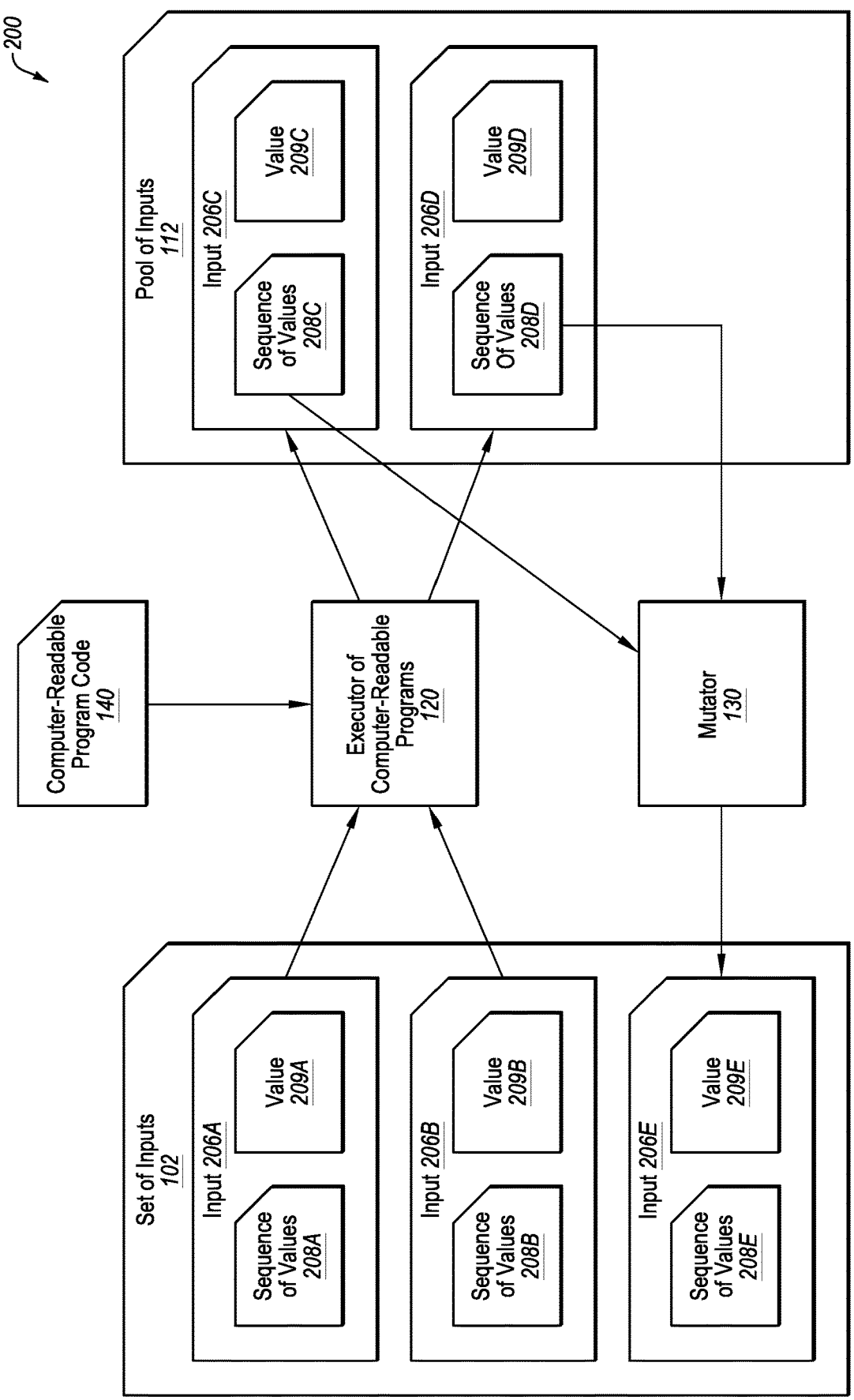
FIG. 2A is a block diagram of another example system for identifying inputs for automated computer-program testing operations.

The present disclosure relates to automated computer-program testing operations. In particular, the present disclosure relates to identifying useful inputs for performing automated computer-program testing. In some embodiments, the useful inputs may be identified by identifying two or more inputs that share a common sequence of values, and generating new inputs that also include the common sequence of values but also include other values. Additionally or alternatively, in some embodiments, inputs may be identified by selecting inputs that cause a particular section of program code to be executed more times than the particular section of program code had been executed previously during the automated testing of the computer program. Such an input may form the basis of new inputs (e.g., by mutating the input that resulted in the particular section for program code being executed multiple times).

The present disclosure may also relate to using multiple approaches to identifying inputs and balancing the ratio of what types of input identification is used based on various identified aspects of the inputs, operation of the program, etc.

Such embodiments of the present disclosure improve the operation of a computer in specific ways. For example, embodiments of the present disclosure may facilitate automated computer-program testing operations to operate more efficiently by identifying useful inputs. For example, if a goal of the automated computer-program testing operations is to test multiple or all branches of a computer program, identifying useful inputs may allow the automated computer-program testing operations to identify inputs that may cause execution of previously unexecuted branches more quickly than other automated computer-program testing operations, for example, typical fuzzing. For example, embodiments of the present disclosure may save computing time and/or resources by identifying useful inputs that may be more likely to accomplish the goal of the automated computer-program testing operations than random inputs.

Additionally or alternatively, embodiments of the present disclosure may improve the efficiency of automated computer-program testing operations by adjusting a ratio between multiple automated computer-program testing operations to allocate computing resources more effectively. For example, in some instances a first fuzzing operation may be better suited to a particular computer-readable program than a second fuzzing operation. By adjusting the ratio between computing resources using the first and second fuzzing operations, computing resources, and/or cost may be saved.

FIG. 1 is a block diagram of an example system 100 for identifying inputs for automated computer-program testing operations according to at least one embodiment described in this disclosure. The system 100 may include an executor of computer-readable programs 120 that may execute computer-readable program code 140 using one or more inputs from a set of inputs 102. For example, the inputs of the set of inputs 102 may be used in execution of the computer-readable program code 140 such that execution of the computer-readable program code 140 based on a given input of the set of inputs 102 may be observed. Based on the execution of the computer-readable program code 140, one or more inputs from the set of inputs 102 may be added to a pool of inputs 112. One or more inputs from the pool of inputs 112 may be mutated by a mutator 130 to generate additional inputs to be added to the set of inputs 102.

In some embodiments, the computer-readable program code 140 may be code from any computer-readable program in any suitable format. The computer-readable program code 140 may be identified or selected to be the subject of automated computer-program testing operations.

In some embodiments, the set of inputs 102 may include one or more values or data sets in any suitable format (for example, binary, hexadecimal, or American Standard code for Information Interchange (ASCII)) to be provided to the executor of computer-readable programs 120. In some embodiments, the set of inputs 102 may be generated randomly, such as for an initial set of inputs 102 for testing. Additionally or alternatively, the set of inputs 102 may include inputs that are generated based on one or more other inputs, (for example, a list of common inputs) and/or the set of inputs 102 may include inputs related to or based on the computer-readable program code 140. For example, the set of inputs 102 may include inputs generated based on what type of input is accepted or expected by the computer-readable program code 140.

In some embodiments, the executor of computer-readable programs 120 may be configured to execute the computer-readable program code 140 using one or more inputs from the set of inputs 102. For example, the executor of computer-readable programs 120 may be configured to repeatedly execute the computer-readable program code 140 using a different input from the set of inputs 102 for each execution. Based on the execution of the computer-readable program code 140 using the inputs from the set of inputs 102, the executor of computer-readable programs 120 may be configured to select one or more inputs from the set of inputs 102 for addition to the pool of inputs 112. For example, the executor of computer-readable programs 120 may be configured to determine whether further executions on inputs related to a particular input may be beneficial or otherwise of interest.

In some embodiments, the executor of computer-readable programs 120 may include one or more criteria used to determine whether further executions on inputs related to a particular input may be beneficial. For example, a goal of automated computer-program testing operations may be to test multiple or all branches of a computer-readable program. The executor of computer-readable programs 120 may be configured to observe and/or record branches executed by executions using different inputs from the set of inputs 102. The executor of computer-readable programs 120 may be configured to select any input for addition to the pool of inputs 112 that causes execution of the computer-readable program code 140 to reach a branch of code not reached by any previous execution. Additional or alternative criteria for selection of inputs for inclusion in the pool of inputs 112 is also contemplated, a further example of which may be discussed further with regard to FIG. 3.

In some embodiments, the executor of computer-readable programs 120 may be configured to test the computer-readable program code 140. For example, the executor of computer-readable programs 120 may be configured to observe and/or record results of the execution of the computer-readable program code 140 using various inputs from the set of inputs 102. For example, the executor of computer-readable programs 120 may record crashes, unexpected behaviors, vulnerabilities, expected program behaviors, or other results. As such, embodiments of the present disclosure may identify inputs for automated testing of a computer-readable program while automated computer-program testing operations of the computer-readable program are ongoing.

In some embodiments the executor of computer-readable programs 120 may include code and routines configured to enable a computing system to perform one or more operations related to identifying inputs for automated computer-program testing operations. Additionally or alternatively, the executor of computer-readable programs 120 may be implemented using hardware including a processor, a microprocessor (e.g., to perform or control performance of one or more operations), a field-programmable gate array (FPGA), and/or an application-specific integrated circuit (ASIC). In some other instances, the executor of computer-readable programs 120 may be implemented using a combination of hardware and software. In the present disclosure, operations described as being performed by the executor of computer-readable programs 120 may include operations that the executor of computer-readable programs 120 may direct a system to perform.

In some embodiments, the pool of inputs 112 may include one more inputs selected from the set of inputs 102. A particular input may be included in the pool of inputs 112 based on a determination that further testing based on inputs related to the particular input may be beneficial.

In some embodiments, the mutator 130 may be configured to alter one or more incoming inputs, for example, a given input from the pool of inputs 112, to generate one or more new inputs based on the incoming input. For example, given an incoming input, the mutator 130 may alter one or more values of the incoming input, add one or more new values to the incoming input, or remove one or more values from the incoming input to generate new input to be added to the set of inputs 102. In these and other embodiments, new values added may be randomly generated, taken from other inputs, or taken from a list of input values (for example a list of common error-inducing values).

In some embodiments, the technique of mutation used by the mutator 130 may be based on more than one input in the pool of inputs 112. For example, the mutator 130 may be configured to identify values common to more than one input of the pool of inputs 112 and mutate certain values in addition to the values common to more than one input of the pool of inputs 112 to generate new inputs for the set of inputs 102. Additionally or alternatively, the mutator 130 may be configured to combine portions of one or more inputs of the pool of inputs 112 to form the new inputs. One or more examples of techniques of mutation are more fully described below with regard to FIGS. 2A and 2B.

In some embodiments, the mutator 130 may include code and routines configured to enable a computing system to perform one or more operations to mutate inputs. Additionally or alternatively, the mutator 130 may be implemented using hardware including a processor, a microprocessor (e.g., to perform or control performance of one or more operations), a field-programmable gate array (FPGA), and/or an application-specific integrated circuit (ASIC). In some other instances, the mutator 130 may be implemented using a combination of hardware and software. In the present disclosure, operations described as being performed by the mutator 130 may include operations that the mutator 130 may direct a system to perform.

As an example of the operation of the system 100, the computer-readable program code 140 may be software subject to automated computer-program testing operations. The executor of computer-readable programs 120 may be configured to test the computer-readable program code 140. The set of inputs 102 may be inputs used during execution of the computer-readable program code 140. As the executor of computer-readable programs 120 is executing the computer-readable program code 140 using inputs from the set of inputs 102, the executor of computer-readable programs 120 may determine if any of the executions satisfy one or more criteria.

For example, a goal of the testing may be to test multiple or all of the branches of the computer-readable program code 140. The criteria, may be such that any input that causes execution of a branch that has not previously been executed satisfies the criteria. Such a criteria may be based on an assumption that any input that causes execution to reach a previously unexecuted branch has potential variations that may cause executions to reach further previously unexecuted branches. Another criteria may be such that any input that causes execution of a branch more times than that branch has been previously executed satisfies the criteria.

Based on an execution of the computer-readable program code 140 using a particular input of the set of inputs 102 satisfying a criteria, the particular input may be added to the pool of inputs 112. The mutator 130 may be configured to alter the inputs in the pool of inputs 112 to generate mutated versions of such inputs to be added to the set of inputs 102 for further testing.

For example, if execution of a computer-readable program code 140 using an input "EBPM0001" from the set of inputs 102 causes the computer program to reach a previously unreached branch, the input may be included in the pool of inputs 112. The mutator 130 may mutate the input to generate inputs such as, for example "EBPM0002," "EBPM0010," and "PMEB0001." Each of the mutated inputs may be added to the set of inputs 102 and may be used during subsequent executions of the computer-readable program code 140.

Modifications, additions, or omissions may be made to the system 100 without departing from the scope of the present disclosure. For example, in some embodiments there may be multiple instances of the executor of computer-readable programs 120 operating in parallel. The multiple instances of the executor of computer-readable programs 120 may be operating using the same computer-readable program code 140, set of inputs 102, and/or pool of inputs 112. Similarly, there may be multiple instances of mutators 130. Further, the order of operations may vary according to different implementations.

FIG. 2A is a block diagram of another example system 200 for identifying inputs for automated computer-program testing operations according to at least one embodiment described in the present disclosure. The system 200 may include a set of inputs 102, a pool of inputs 112, an executor of computer-readable programs 120, a mutator 130, and a computer-readable program code 140 that may be similar to or the same as what was described above with regard to system 100 of FIG. 1.

Five inputs are illustrated in FIG. 2A: a first input 206A, a second input 206B, a third input 206C, a fourth input 206D, and a fifth input 206E (collectively referred to as the inputs 206). Each of the illustrated five inputs 206 may include a sequences of values. Thus, five sequences of values are illustrated in FIG. 2A: a first sequences of values 208A, a second sequences of values 208B, a third sequences of values 208C, a fourth sequences of values 208D, and a fifth sequences of values 208E (collectively referred to as the sequences of values 208). Each of the illustrated five inputs 206 may include a value. Thus, five values are illustrated in FIG. 2A: a first value 209A, a second value 209B, a third value 209C, a fourth value 209D, and a fifth value 209E (collectively referred to as the values 209). However, the number of inputs, sequences of values, and/or values may vary according to different implementations.

In some embodiments, the executor of computer-readable programs 120 may execute the computer-readable program code 140 using the inputs 206. For example, the executor of computer-readable programs 120 may execute the computer-readable program code 140 using the input first 206A during one execution and the second input 206B during another execution. Each of the first input 206A and the second input 206B may be selected for inclusion in the pool of inputs 112 based on the first input 206A and the second input 206B meeting one or more of the criteria identifying the input as one to include in the pool of inputs 112. For illustration purposes, the first input 206A, may be included in the pool of inputs 112 as the third input 206C. And, the second input 206B may be included in the pool of inputs 112 as the fourth input 206D.

In some embodiments, the mutator 130 may generate new inputs based on one or more of the inputs in the pool of inputs 112. For example, the mutator 130 may generate the fifth input 206E based on one or more of the third input 206C and the fourth input 206D. In some embodiments, the mutator 130 may generate the fifth input 206E based on both of the third input 206C and the fourth input 206D. In some embodiments, the mutator 130 may generate mutated inputs by retaining a sequence of values 208 that is common to one or more of the inputs 206 in the pool of inputs 112. For example, each of the third input 206C and the fourth input 206D may include a sequences of values 208 that is common to both the third input 206C and the fourth input 206D. For example, the third sequence of values 208C and the fourth sequence of values 208D may include the same values. Additionally, the third input 206C and the fourth input 206D may include one or more values that are different, for example, the third value 209C and the fourth value 209D may be different values. The mutator 130 may mutate on the third and/or fourth values 209C/209D. For example, the third input 206C may be "EBPM2018" and the fourth input 206D may be "EBPM1970," such that with reference to FIG. 2A, the third sequence of values 208C and the fourth sequence of values 208D may both be "EBPM," and the third value 209C may be "2018" and the fourth value 209D may be "1970."

In some embodiments, the mutator 130 may be configured to identify one or more commonalities between two or more of the inputs 206 of the pool of inputs 112. The mutator 130 may be configured to generate additional inputs based on the commonalities between the inputs 206 of the pool of inputs 112. For example, the mutator 130 may identify the sequence of values 208C as being the same as the fourth sequence of values 208D, for example, "EBPM." Additionally or alternatively, the mutator 130 may be configured to generate the fifth input 206E such that it includes the fifth sequence of values 208E that is the same as the third sequence of values 208C and the fourth sequence of values 208D, for example, "EBPM."

Additionally or alternatively, the mutator 130 may be configured to generate the fifth input 206E such that it includes a fifth value 209E that is different from either of the third value 209C and the fourth value 209D. For example the fifth value 209E may be "1776" such that the fifth input 206E may be "EBPM1776."

For an example of the mutation of values, in some embodiments, the fifth value 209E may be randomly generated based on one or more values, such as, for example, the third value 209C and/or the fourth value 209D. For example, the mutator 130 may randomly flip one or more bits of the third value 209C, repeat sections of the third value 209C, remove portion so of the third value 209C, and/or combine portions of third value 209C with portions of fourth value 209D. Additionally or alternatively, the fifth value 209E may be based on one or more other values, for example, the fifth value 209E may be obtained from a list of common values. Additionally or alternatively, the fifth value 209E may be randomly generated.

Modifications, additions, or omissions may be made to the system 200 without departing from the scope of the present disclosure. For example, although only three inputs are shown in the set of inputs 102 and only two inputs are shown in the pool of inputs 112, each of the set of inputs 102 and the pool of inputs 112 may include any number of inputs, such as hundreds or thousands of inputs, or more. Additionally, although the fifth input 206E is described as being a single input, any number of inputs may be generated based on a sequence of values 208. Additionally, although the fifth input 206E is described as being based on two inputs, the third input 206C and the fourth input 206D, the fifth input 206E may be based on any number of inputs 206. Further, the order of operations may vary according to different implementations.

Figure 2B:
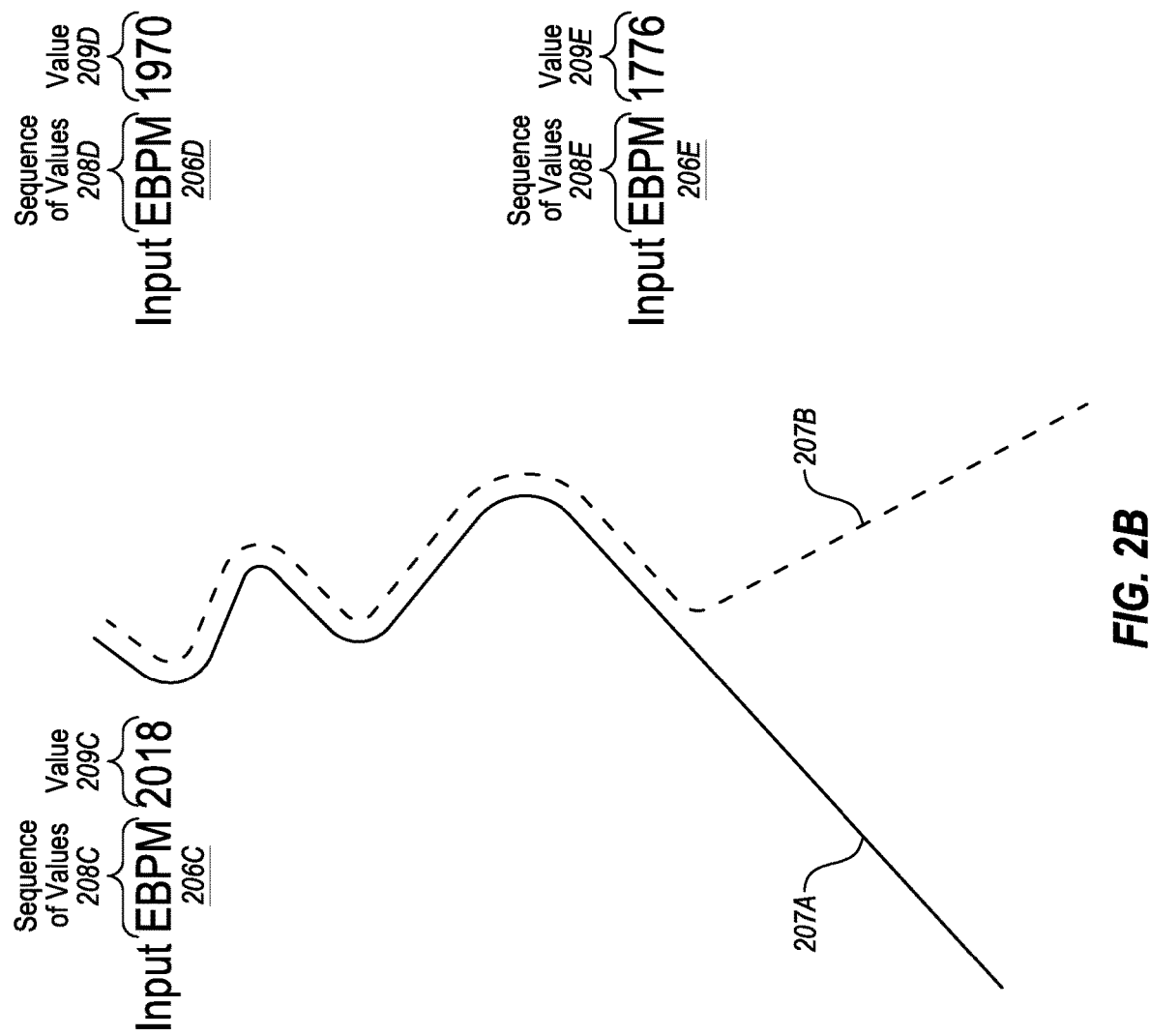
FIG. 2B illustrates example inputs and program paths used in identifying inputs for automated computer-program testing operations.

FIG. 2B illustrates example inputs 206 and program paths 207 used in identifying inputs for automated computer-program testing operations according to at least one embodiment described in this disclosure. For example, FIG. 2B may illustrate visually what was described textually with respect to FIG. 2A.

For example, the first input 206A may be "EBPM2018" and may cause execution of the computer-readable program code 140 to take a first path 207A. The first path 207A may not have been taken by any previous execution of the computer-readable program code during the automated computer-program testing operations. Consequently, the first input 206A may satisfy a criteria for inclusion in the pool of inputs 112 and thus be selected for inclusion in the pool of inputs 112 as the third input 206C. The second input 206B may be "EBPM1970" and may cause execution of the computer-readable program code 140 to take a second path 207B. The second path 207B may not have been taken by any previous execution of the computer-readable program code during the automated computer-program testing operations. Consequently, the second input 206B may satisfy a criteria for inclusion in the pool of inputs 112 and thus be selected for inclusion in the pool of inputs 112 as the fourth input 206D, although any criteria is consistent with the present disclosure.

In some embodiments, the mutator 130 may be configured to identify that the third input 206C and the fourth input 206D both include the same sequence of values 208, for example "EBPM."

In some embodiments, the mutator 130 may be configured to generate the fifth input 206E to include the sequence of value 208, for example "EBPM," as the fifth sequence of values 208E. The mutator 130 may be configured to generate one or more new values 209E to include in the fifth input 206E that may be different from the values of the third input 206C and the fourth input 206D, for example "1776."

Figure 3:
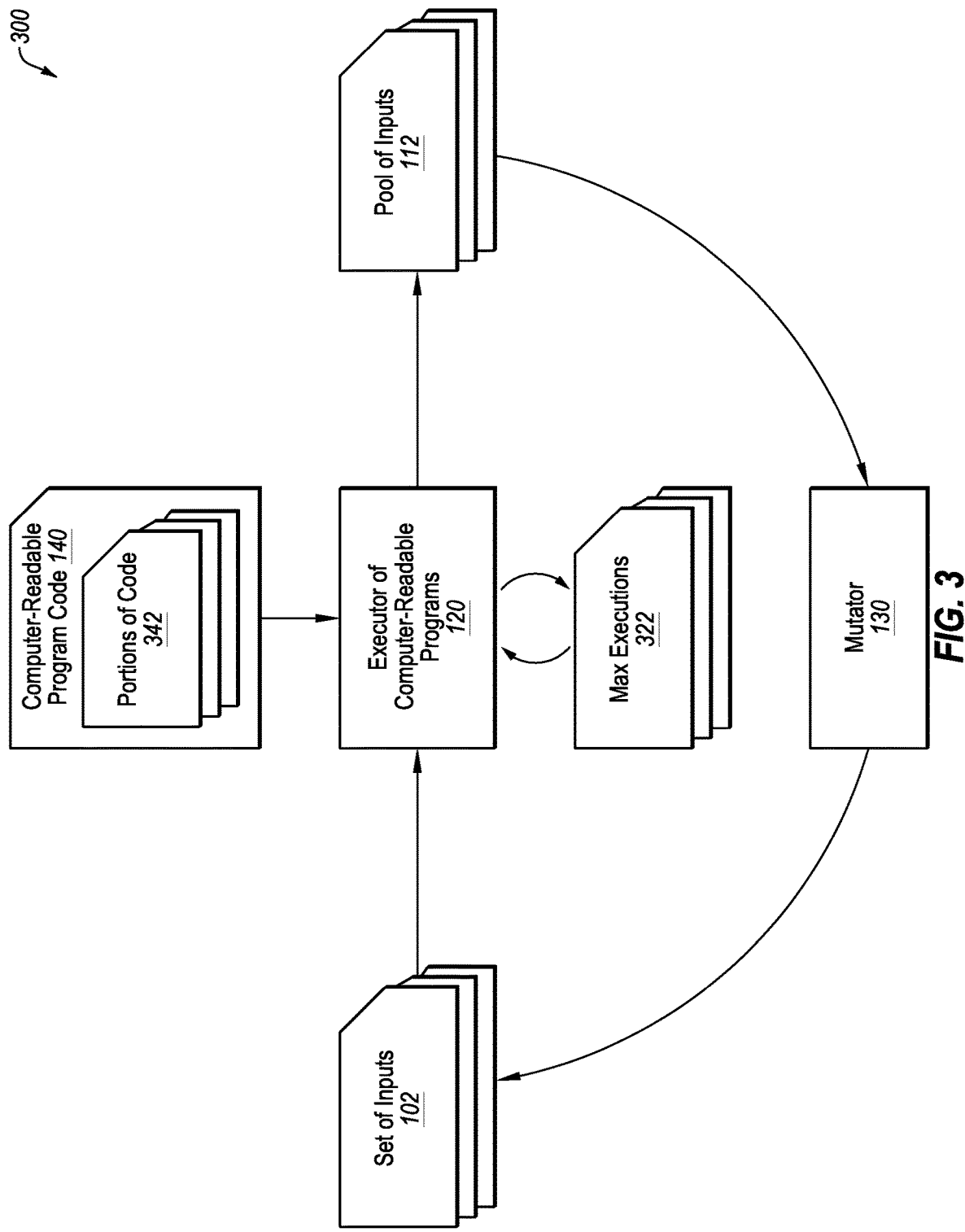
FIG. 3 is a block diagram of another example system for identifying inputs for automated computer-program testing operations.

FIG. 3 is a block diagram of another example system 300 for identifying inputs for automated computer-program testing operations according to at least one embodiment described in this disclosure. The system 300 may include a set of inputs 102, a pool of inputs 112, an executor of computer-readable programs 120, a mutator 130, and a computer-readable program code 140 that may be similar to or the same as what was described above with regard to system 100 of FIG. 1 and/or system 200 of FIG. 2A, although the bases for selecting inputs to be included in the pool of inputs 112 may include additional or alternative bases.

In some embodiments, the portions of code 342 may include a subdivision of the computer-readable program code 140. The portions of code 342 may include subdivisions of any size. For example, the portions of code 342 may subdivide the computer-readable program code 140 into functions, methods, blocks, lines of code, blocks of operating instructions, or individual operating instructions. The entirety of the computer-readable program code 140 may be subdivided into the portions of code 342. Additionally or alternatively, a portion of the computer-readable program code 140 that is being specifically tested may be subdivided into the portions of code 342.

In some embodiments, the executor of computer-readable programs 120 may track a number executions of each of the portions of code 342 for each execution of the computer-readable program code 140. For example, the executor of computer-readable programs 120 may execute the computer-readable program code 140 using a first input of the set of inputs 102. The executor of computer-readable programs 120 may track how many times each of the portions of code 342 are executed during the execution using the first input.

In some embodiments, the executor of computer-readable programs 120 may be configured to store a maximum number of executions for each of the portions of code 342 as the max executions 322. The max executions 322 may include a maximum number of times that each of the portions of code 342 has been executed during previous executions of the computer-readable program code 140.

In some embodiments, the executor of computer-readable programs 120 may be configured to execute the computer-readable program code 140 using a particular input from the set of inputs 102. The executor of computer-readable programs 120 may be configured to track a number of executions of each of the portions of code 342. The executor of computer-readable programs 120 may be configured to compare each of the number of executions of each of the portions of code 342 to the corresponding number of executions in the max executions 322. If the execution using the particular input caused the executor of computer-readable programs 120 to execute a particular portion of code 342 more times than the particular portion of code 342 had been executed during any previous execution and recorded in the max executions 322, the executor of computer-readable programs 120 may be configured to include the particular input in the pool of inputs 112 and update the max executions 322.

Table 1 gives an example of inputs and responses of the executor of computer-readable programs 120.

TABLE 1

| Portion | Max Executions before input X | Executions in response to input X | Max Executions after input X |
|---|---|---|---|
| a → b | 1 | 1 | 1 |
| b → c | 3 | 1 | 3 |
| c → d | 1 | 3 | 3 |
| d → e | 6 | 6 | 6 |

For example, in reference to Table 1, a portion of the computer-readable program code 140 "a→b" may have been executed, at most, one time during any execution of the computer-readable program code 140 prior to an execution of the computer-readable program code 140 using a particular input X. Likewise, a portion "b→c" may have been executed three times, and a portion "c→d" may have been executed one time and a portion "d→e" may have been executed six times during prior executions of the computer-readable program code 140. The maximum number of executions of each of the portions may be stored in the max executions 322, for example, the max executions 322 may include information representing the second column of Table 1.

The executor of computer-readable programs 120 may execute the computer-readable program code 140 using the input X. In response, the portion "a→b" may be executed one time, the portion "b→c" may be executed one time, the portion "c→d" may be executed three times, and the portion "d→e" may be executed six times.

The executor of computer-readable programs 120 may compare the number of executions or each of the portions with the number of executions of corresponding portions stored in the max executions 322. For example, the execution of the portion "a→b" one time during the execution using the input X may be compared with the one time the portion "a→b" was executed by an input prior to the input X. In response to the portion "a→b" being executed the same number of times, the remaining portions may be checked to determine whether the input X is to be discarded without adding the input X to the pool of inputs 112.

The execution of the portion "b→c" one time during the execution using the input X may be compared with the three times the portion "b→c" was executed by an input prior to the input X. In response to the portion "b→c" being executed more times during a prior execution, the remaining portions may be checked to determine whether the input X is to be discarded without adding the input X to the pool of inputs 112.

The execution of the portion "c→d" three times during the execution using the input X may be compared with the one time the portion "c d" was executed by an input prior to the input X. In response to the portion "c→d" being executed more times during the execution using the input X than any prior execution, the input X may be added to the pool of inputs 112 and the max executions 322 may be updated to the number of times the portion "c→d" was executed using the input X. For example, the max executions 322 may be updated to represent information representing the second column of Table 1.

The execution of the portion "d→e" six times during the execution using the input X may be compared with the six times the portion "d→e" was executed by an input prior to the input X. In response to the portion "d→e" being executed the same number of times, nothing may happen.

The executor of computer-readable programs 120 may be configured to use execution of a portion of code more times than that portion had been previously executed as a criteria for the selection of inputs for inclusion in the pool of inputs 112. An input that causes an execution of a portion of code more times than that portion of code had been previously executed may be beneficial for further testing.

In some embodiments, the max executions 322 may be represented by a data structure with one component representing each of the particular portions of code. For example, the max executions 322 may include an eight-bit number, for example, an integer from zero to two hundred fifty-five, for each of the portions of code within the computer-readable program code 140. In these and other embodiments, if the testing causes the computer program to execute the particular portion of code more times than the two hundred fifty-five, the additional information may be lost. Such an approach may allow the data structure to utilize the improved approach described herein while utilizing a small amount of computing resources to store the information. In some embodiments, the approach described herein may utilize the same amount as or less storage computing resources compared to traditional fuzzing operations.

Modifications, additions, or omissions may be made to the system 300 without departing from the scope of the present disclosure. Further, the order of operations may vary according to different implementations.

Figure 4:
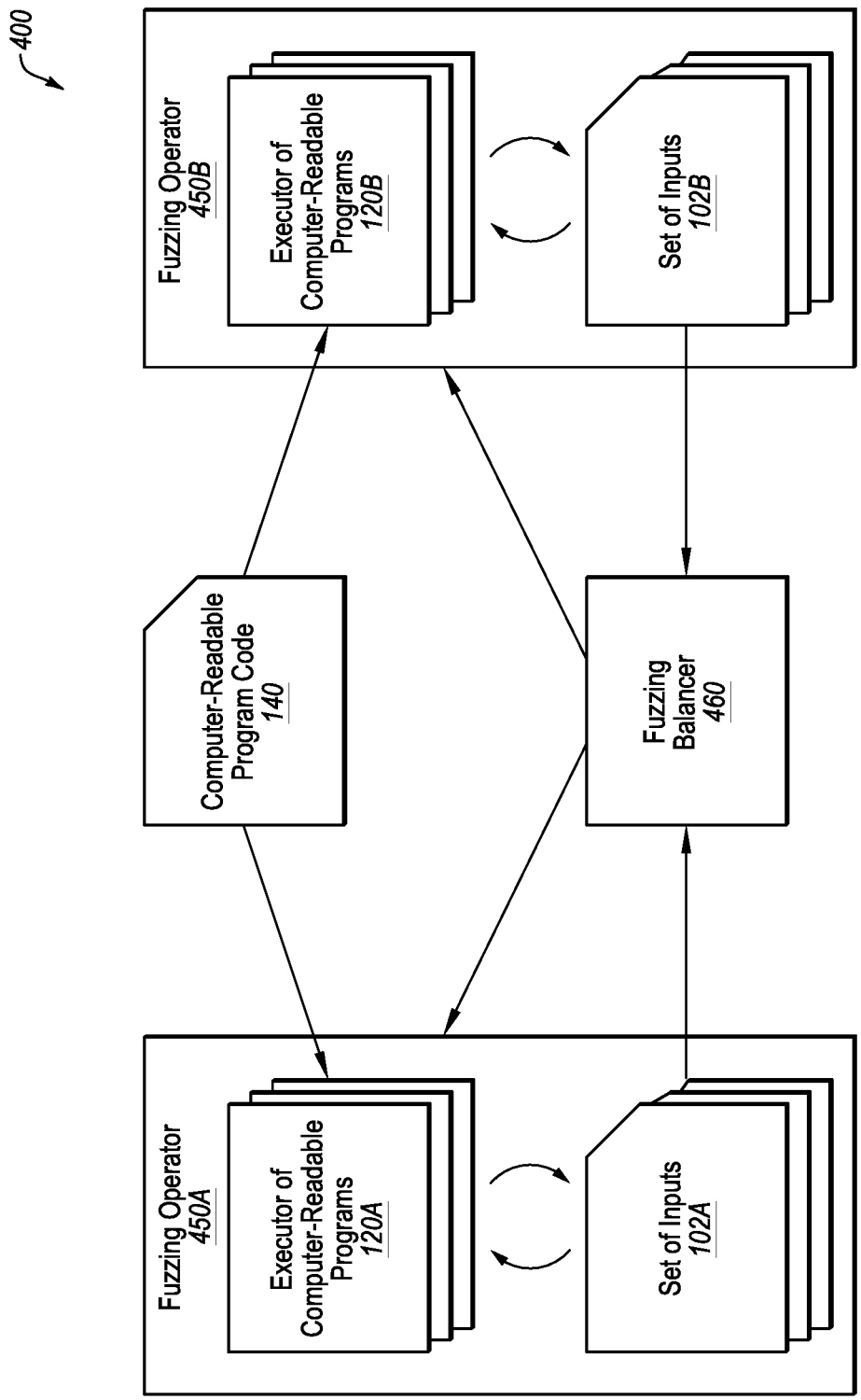
FIG. 4 is a block diagram of an example system for conducting automated computer-program testing operations.

FIG. 4 is a block diagram of an example system 400 for conducting automated computer-program testing operations according to at least one embodiment described in the present disclosure. In general, the system 400 may conduct automated computer-program testing operations on a computer-readable program code 140 using two or more different fuzzing operators 450. The computer-readable program code 140 may be the same as or substantially similar to the computer-readable program code 140 of FIGS. 1, 2A, and/or 3. A fuzzing balancer 460 may determine a balance between the two or more different fuzzing operators 450.

Two fuzzing operators are illustrated in FIG. 4: a first fuzzing operator 450A, and a second fuzzing operator 450B, (collectively referred to as the fuzzing operators 450). Each of the illustrated fuzzing operators 450 may include an executor of computer-readable programs 120. Thus, two executors of computer-readable programs 120 are illustrated in FIG. 4: a first executor of computer-readable programs 120A, and a second executor of computer-readable programs 120B, (collectively referred to as the executors of computer-readable programs 120). Each of the illustrated fuzzing operators 450 may include a set of inputs 102. Thus, two sets of inputs 102 are illustrated in FIG. 4: a first set of inputs 102A, and second set of inputs 102B, (collectively referred to as the sets of inputs 102). However, the number of fuzzing operators 450, executors of computer-readable programs 120, and/or sets of inputs 102 may vary according to different implementations.

In some embodiments, one or more of the fuzzing operators 450 may be similar to or the same as the system 100 of FIG. 1, the system 200 of FIG. 2A, and/or the system 300 of FIG. 3. For example, one or more of the fuzzing operators 450 may identify inputs for the set of inputs 102 similar to the way that the system 300 of FIG. 3 identifies inputs for the set of inputs 102. Additionally or alternatively, one or more of the fuzzing operators 450 may mutate inputs similar to the way the system 200 of FIG. 2A mutates inputs. As such, although not illustrated, the fuzzing operators 450 may each include a pool of inputs and a mutator. Additionally or alternatively one or more of the fuzzing operators 450 may include on or more features of both of the system 200 of FIG. 2A and/or the system 300 of FIG. 3. Additionally or alternatively, one of more of the fuzzing operators 450 may be different from the system 100 of FIG. 1, the system 200 of FIG. 2A, and/or the system 300 of FIG. 3.

The system 400 may be configured to conduct two or more different automated computer-program testing operations using two or more different fuzzing operators 450. The fuzzing balancer 460 may be configured to evaluate the operations of the fuzzing operators 450 and determine how to balance the fuzzing operators 450 consistent with the goal of the testing of the computer-readable program code 140. For example, the fuzzing balancer 460 may be configured to compare the operations of two or more of the fuzzing operators 450 to determine which of the two or more fuzzing operators 450 is performing more effectively with regard to the goal of the testing of the computer-readable program code 140, which of the fuzzing operators 450 is best suited to the computer-readable program code 140, and/or a current state of the fuzzing operators 450. The fuzzing balancer 460 may be configured to allocate more computing resources, for example, to one or more of the fuzzing operators 450 that is performing more effectively with regard to the goal of the executing all of the branches of the computer-readable program code 140. The system 400 may continue to conduct the automated computer-program testing operations according to the allocation of the fuzzing balancer 460. The computing resources allocable among the two or more fuzzing operators 450 may include a number of computing systems or processors or a duration or percentage of time to run operations.

In some embodiments, the fuzzing balancer 460 may be configured to determine which of the fuzzing operators 450 is performing more effectively with regard to the goal of the testing, which of the fuzzing operators 450 is best suited to the computer-readable program code 140, and/or a current state of the fuzzing operators 450 by using one or more criteria related to the fuzzing operations being carried on by the fuzzing operators 450.

For example, in a case where the first fuzzing operator 450A is implementing a fuzzing operation similar to what was described above with regard to FIGS. 2A and 2B, the criteria for determining whether to allocate more computing resources to the first fuzzing operator 450A may be based on values in the first set of inputs 102A and/or the second set of inputs 102B. In some embodiments, the fuzzing balancer 460 may be configured to analyze one or more sets of inputs 102 to determine a number of inputs that satisfy a length threshold and/or a commonality threshold.

In some embodiments, the length threshold may include a condition based on the length, or number of values or characters in an input. The length threshold may be a number of values, or characters, such as, for example, four, eight or sixteen. Additionally or alternatively, the length threshold may be relative to other inputs in the sets of inputs. For example, the length threshold may be based on the average length of inputs in one or more of the sets of inputs 102. Additionally or alternatively the length threshold may be based on the standard deviation of the lengths of all of the inputs in one or more of the sets of inputs 102. For example, the length threshold may be satisfied by any input with a length that is longer than the average length by the standard deviation.

In some embodiments, the commonality threshold may be a condition based on a number of characters or values that may be shared by two or more inputs of a set of inputs 102. The commonality threshold may be a number of characters that are the same in two or more inputs, such as, for example, four, eight, or sixteen. Additionally or alternatively, the commonality threshold may be relative to the length of one or more inputs of a set of inputs. For example, the commonality threshold may be satisfied when two inputs have in common values that are half as long as the total length of one of the inputs, or a third as long as the average input in the set of inputs 102.

In some embodiments, the fuzzing balancer 460 may be configured to analyze the number of inputs in one or more of the sets of inputs 102 that satisfies the length threshold and/or the commonality threshold to determine whether the number of inputs that satisfies the length threshold and/or the commonality threshold satisfies a queue threshold. In some embodiments, the queue threshold may include a condition based on the number of inputs that satisfy both of the length threshold and the commonality threshold. In other embodiments, the queue threshold may include a condition based on the number of inputs that satisfy the length threshold and do not satisfy the commonality threshold. The queue threshold may be a number of inputs, such as, for example, sixteen, thirty-two, or sixty-four. Additionally or alternatively, the queue threshold may be relative to the number of inputs in one or more of the sets of inputs 102. For example, the queue threshold may be satisfied when half or two thirds of the inputs in a set of inputs satisfy the length threshold.

Because fuzzing operations described above with regard to FIGS. 2A and 2B may to multiple inputs, the fuzzing balancer 460 may be configured to analyze the sets of inputs 102 to determine whether or not to allocate additional resources to one or more of the fuzzing operators 450. For example, the fuzzing balancer 460 may be configured to analyze the sets of inputs 102 to determine the lengths of one or more of the inputs of the sets of inputs 102 and compare them to the length threshold. Additionally or alternatively, the fuzzing balancer identify and/or mutate inputs for the set of inputs 102 based on a sequence of values common 460 may be configured to analyze the number of values or characters common to two or more of the inputs of the sets of inputs 102 to determine how many inputs of the sets of inputs 102 satisfy the commonality threshold. Additionally or alternatively, the fuzzing balancer 460 may be configured to determine how many inputs of the sets of inputs satisfy the length threshold and the commonality threshold. Additionally or alternatively, the fuzzing balancer 460 may be configured to determine how many inputs of the sets of inputs satisfy the length threshold and do not satisfy the commonality threshold. Additionally, the fuzzing balancer 460 may be configured to compare the number of inputs of the set of inputs 102 that satisfy the length threshold and the commonality threshold to a queue threshold to determine whether to allocate more resources to the one or more fuzzing operators 450. Additionally, the fuzzing balancer 460 may be configured to compare the number of inputs of the set of inputs 102 that satisfy the length threshold and do not satisfy the commonality threshold to a queue threshold to determine whether to allocate more resources to the one or more fuzzing operators 450.

In some embodiments, where the first fuzzing operator 450A is implementing a fuzzing operation similar to what is described above with regard to FIG. 3, the criteria for determining whether to allocate more computing resources to the first fuzzing operator 450A may be based on untraversed branches in a control flow graph. In some embodiments, one or more of the fuzzing operators 450 and/or the fuzzing balancer 460 may obtain a control flow graph of the computer-readable program code 140. Traces or a listing of branches covered during executions of the computer-readable program code 140 may be stored and compared to the control flow graph. The comparison may be used to determine untraversed branches. In these and other embodiments, the untraversed branches may be the basis for the determination of how to allocate resources between two or more fuzzing operators 450 by the fuzzing balancer 460. Additionally or alternatively, the criteria for determining how to allocate resources by the fuzzing balancer 460 may be based on untraversed traces that satisfy another condition related to execution of the computer-readable program code 140. For example, the criteria may be based on a number of untraversed traces that include a loop, or have the potential to cause repeated execution of a branch in the control flow graph.

In some embodiments, the number of untraversed branches may be compared to a trace threshold to determine whether to allocate additional resources to a particular fuzzing operator 450. The trace threshold may include a number of untraversed branches, and/or untraversed branches that include a loop. The trace threshold may be a number of branches such as, for example, one thousand twenty-four, two thousand forty-eight, or four thousand ninety-six. Additionally or alternatively, the trace threshold may be relative to the total number of branches and/or loops in the control flow graph. For example, the trace condition may be satisfied if three quarters of the branches that include loops are untraversed.

Because fuzzing operations described above with regard to FIG. 3 may identify inputs for the set of inputs 102 based on a number of times a branch has been executed, the fuzzing balancer 460 may be configured to analyze untraversed branches to determine whether to allocate additional resources to one or more of the fuzzing operators 450. For example, the fuzzing balancer 460 may be configured to analyze untraversed branches, and/or untraversed loops and compare them to the trace threshold to determine whether to allocate more resources to the one or more fuzzing operators 450.

Although described separately, the fuzzing operations described with regard to FIGS. 2A and 2B may be implemented with the fuzzing operations described with regard to FIG. 3. Additionally or alternatively, though described separately, the fuzzing balancer 460 may determine the balancing of fuzzing operations based on any or all of the length threshold, the commonality threshold, the queue threshold, and/or the trace threshold.

For an example of the operation of the system 400, each of the fuzzing operators 450 may execute the computer-readable program code 140 using different fuzzing operations. As the fuzzing operators 450 proceed they may identify and/or mutate inputs to include in their respective sets of inputs 102. Thus, after several executions the first set of inputs 102A may be different than the second set of inputs 102B. Additionally, traces may be recorded and the untraversed branches for each of the fuzzing operations may be updated. The fuzzing balancer 460 may analyze each of the sets of inputs 102 and/or the untraversed branches to determine how to balance the fuzzing operations.

For example, the first fuzzing operator 450A may implement fuzzing operations that mutate inputs based on common sequences of values. The fuzzing balancer 460 may determine that one half of all the inputs in the first set of inputs 102A include sequences of values, longer than four values, that are common to at least one other input in the first set of inputs 102A. Based on this determination the fuzzing balancer 460 may allocate additional computing resources to the first fuzzing operator 450A. As another example, the fuzzing balancer 460 may determine that out of one hundred inputs that are longer than 10 values, zero share a common sequence of values. Based on this determination the fuzzing balancer 460 may deallocate some of the computing resources allocated to the first fuzzing operator 450A and allocate them to another fuzzing operator 450.

As another example, the second fuzzing operator 450B may implement fuzzing operations that identify inputs for the second set of inputs 102B based on an input that causes a branch of the computer-readable program code 140 to be executed more times than that branch was previously executed. In such an embodiment, the fuzzing balancer 460 may determine that the control flow graph includes one thousand loops, and that one quarter of those have been traversed. Based on these determinations, the fuzzing balancer 460 may allocate additional computer resources to the second fuzzing operator 450B. As another example, the fuzzing balancer 460 may determine that the control flow graph includes one thousand loops, and that three quarters of those have been traversed. Based on these determinations, the fuzzing balancer 460 may deallocate some of the computing resources allocated to the second fuzzing operator 450B and allocate them to another fuzzing operator 450.

Modifications, additions, or omissions may be made to the system 400 without departing from the scope of the present disclosure. For example, one or more of the fuzzing operators 450 may share a set of inputs 102. Further, the order of operations may vary according to different implementations.

Figure 5:
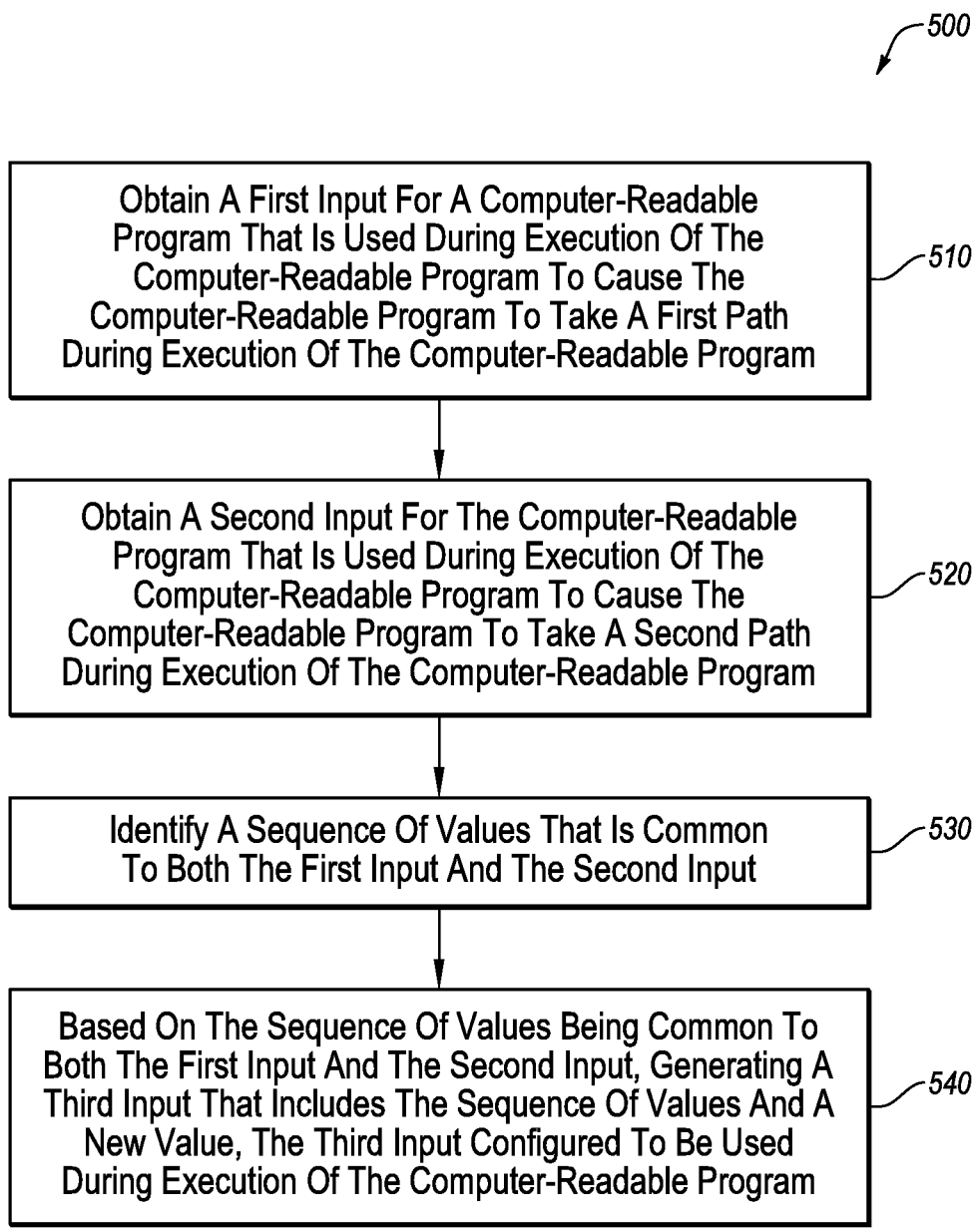
FIG. 5 is a flow chart of an example process for identifying inputs for automated computer-program testing operations.

FIG. 5 is a flow chart of an example process 500 for identifying inputs for automated computer-program testing operations, according to at least one embodiment described in the present disclosure. In some embodiments, one or more of the operations associated with the process 500 may be performed by the system 100 of FIG. 1, the system 200 of FIG. 2A, the system 300 of FIG. 3, or the system 400 of FIG. 4. The process 500 may be performed by any suitable system, apparatus, or device. For example, the computing system 700 of FIG. 7 may perform one or more of the operations associated with the process 500. Although illustrated with discrete blocks, the steps and operations associated with one or more of the blocks of the process 500 may be divided into additional blocks, combined into fewer blocks, or eliminated, depending on the desired implementation.

At block 510, a first input for a computer-readable program may be obtained by an executor of computer programs. The first input may be the same as or similar to an input of the set of inputs 102 of FIG. 1 or the first input 206A of FIG. 2A as described above. The computer-readable program may be the same as or similar to the computer-readable program code 140 of FIG. 1 described above. The executor of computer-readable programs may be the same as or similar to the executor of computer-readable programs 120 of FIG. 1. The executor of computer-readable programs may execute the computer-readable program using the first input. The first input may cause the computer-readable program to take a first path during execution of the computer-readable program. In some embodiments, the computer-readable program may be executing using the first input, and the first path may be observed and/or recorded.

At block 520, a second input for the computer-readable program may be obtained. The second input may be the same as or similar to an input of the set of inputs 102 of FIG. 1 or the second input 206B of FIG. 2A as described above. The second input may be used during execution of the computer-readable program to cause the computer-readable program to take a second path during execution of the computer-readable program. In some embodiments, the computer-readable program may be executing using the second input, and the second path may be observed and/or recorded. The second path may be different from the first path. In some embodiments, the first path may be compared with the second path to determine whether the second path differs from the first path.

At block 530, a sequence of values that is common to both the first input and the second input may be identified. The sequence of values may be the same as or similar to the sequence of values 208 as described above with regard to FIGS. 2A and 2B. In some embodiments, the sequence of values may only be identified if the sequence of values satisfies a length threshold.

At block 540, based on the sequence of values being common to both the first input and the second input, a third input may be generated. The third input may be the same as or similar to an input of the set of inputs 102 of FIG. 1 or the fifth input 206E of FIG. 2A as described above. The third input may include the sequence of values that is common to both the first and second inputs, and a new value. In these and other embodiments, the third input may be configured to be used during execution of the computer-readable program and may be added to the set of inputs. The new value may be a random value, a mutated value based on one or both of the first and/or second inputs, etc.

In some embodiments, the process 500 may be repeated multiple times and each input that causes the computer-readable program to take a path that was not previously taken may be stored. Further each input that causes the computer-readable program to take a path that was not previously taken may be compared to the stored inputs to determine whether there is a common sequence of values between the input that causes the computer-readable program to take a path that was not previously taken and any previously stored input. Additionally or alternatively, the stored inputs may be analyzed to determine whether any of the stored inputs include a sequence of values that is common between more than one of the stored inputs.

Modifications, additions, or omissions may be made to the process 500 without departing from the scope of the present disclosure. Further, the order of operations may vary according to different implementations.

Figure 6:
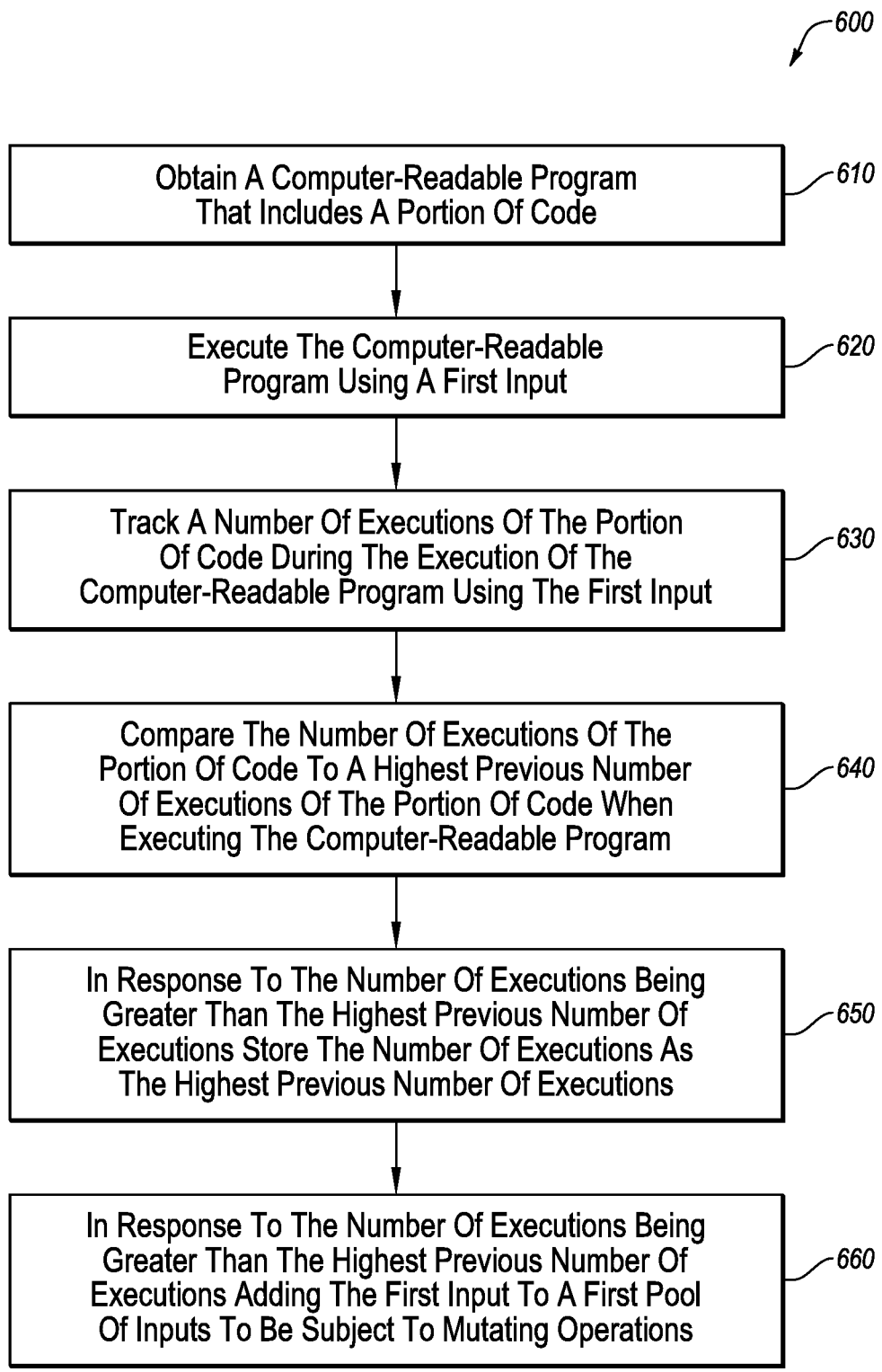
FIG. 6 is a flow chart of another example process for identifying inputs for automated computer-program testing operations.

FIG. 6 is a flow chart of another example process 600 for identifying inputs for automated computer-program testing operations, according to at least one embodiment described in this disclosure. In some embodiments, one or more of the operations associated with the process 600 may be performed by the system 100 of FIG. 1, the system 200 of FIG. 2A, the system 300 of FIG. 3, or the system 400 of FIG. 4. The process 600 may be performed by any suitable system, apparatus, or device. For example, the computing system 700 of FIG. 7 may perform one or more of the operations associated with the process 600. Although illustrated with discrete blocks, the steps and operations associated with one or more of the blocks of the process 600 may be divided into additional blocks, combined into fewer blocks, or eliminated, depending on the desired implementation.

At block 610, a computer-readable program may be obtained by an executor of computer-readable programs. The computer-readable program may include a portion of code. The computer-readable program may be the same as or similar to the computer-readable program code 140 of FIG. 1 as described above. The portion of code may be the same as or similar to a portion of code of the portions of code 342 of FIG. 3 as described above. The executor of computer-readable programs may be the same as or similar to the executor of computer-readable programs 120 of FIG. 1 as described above.

At block 620, the computer-readable program may be executed by the executor of computer programs using a first input. The first input may be the same as or similar to an input of the set of inputs 102 of FIG. 1 as described above.

At block 630, a number of executions of the portion of code during the execution of the computer-readable program using the first input may be tracked and/or stored.

At block 640, the number of executions of the portion of code may be compared to a highest previous number of executions of the portion of code when executing the computer-readable program. For example, the computer-readable program may have been executed multiple times using multiple different inputs. For each of the multiple times the computer-readable program was executed, a number of executions of the portion of code may have been tracked and/or stored, for example, in a table such as the max executions 322 of FIG. 3.

At block 650, in response to the number of executions being greater than the highest previous number of executions, the number of executions may be stored as the highest previous number of executions. The storing of the number of executions as the highest previous number of executions may be done so that the process 600 may be run repeatedly and the highest previous number of executions may be updated any time an execution exceeds the highest previous number of executions.

At block 660, in response to the number of executions being greater than the highest previous number of executions, the first input may be added to a first pool of inputs to be subject to mutating operations.

In some embodiments, the process 600 may be repeated multiple times and each input that executes the portion of code more times than the highest previous number of executions may be added to the pool of inputs and the highest previous number of executions may be updated.

In some embodiments, the process 600 may be applied to multiple portions of code within the computer-readable program. For example, the execution using the first input may be tracked with regard to the multiple portions of code. Also, there may be a highest previous number of executions for each of the multiple portions of code. For example, the max executions 322 of FIG. 3 may include a table with a highest previous number of executions for each of the multiple portions of code. In the event that the execution using the first input is greater than any of the highest previous number of executions, the first input may be added to the pool of inputs and the highest previous number of executions may be updated.

In some embodiments, inputs of the first pool of inputs may be mutated to generate new inputs to be added to the set of inputs. For example, the first input may be altered by: the random flipping of one or more bits within the first input, repeating one or more values within the first input, removing one or more values from the first input, and adding one or more values from another input into the first input.

In some embodiments, the one or more mutated versions of the first inputs may be used as the first input in the process 600.

Modifications, additions, or omissions may be made to the process 600 without departing from the scope of the present disclosure. Further, the order of operations may vary according to different implementations.

One skilled in the art will appreciate that, for the system 100, the system 200, the system 300, system 400, the process 500, and the process 600 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

The embodiments described herein may include the use of a special-purpose or general-purpose computer including various computer hardware or software modules, as discussed in greater detail below.

Figure 7:
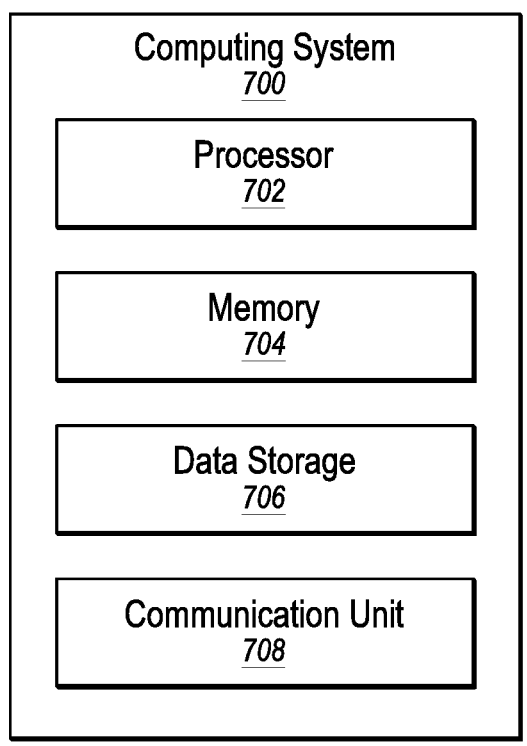
FIG. 7 is a block diagram of an example computing system, all according to at least one embodiment described in the present disclosure.

FIG. 7 is a block diagram of an example computing system 700, which may be according to at least one embodiment described in this disclosure. As illustrated in FIG. 7, the computing system 700 may include a processor 702, a memory 704, a data storage 706, and a communication unit 708.

One or more components of the systems 100, 200, 300, and/or 400 of FIGS. 1-4 may be implemented on a computing system such as the computing system 700 of FIG. 7. For example, the computer-readable program code 140 may be stored in the memory 704 and/or the data storage 706. The processor 702 may perform one or more operations related to the executor of computer-readable programs 120 and/or the mutator 130. The processor 702 may execute the computer-readable program code 140 by calling various inputs of the set of inputs 102 stored in the memory 704 and/or the data storage 706 to execute the computer-readable program code 140. And the pool of inputs 112, and the max executions 322 may be stored in the memory 704 and/or the data storage 706. Additionally, the fuzzing operators 450 may likewise be executed by the processor 702 using the memory 704 and the data storage 706. Additionally, the processor 702 may perform one or more operations related to the fuzzing balancer 460 to balance how many processing cycles are dedicated to the different fuzzing operations 450.

Generally, the processor 702 may include any suitable special-purpose or general-purpose computer, computing entity, or processing device including various computer hardware or software modules and may be configured to execute instructions stored on any applicable computer-readable storage media. For example, the processor 702 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, it is understood that the processor 702 may include any number of processors distributed across any number of network or physical locations that are configured to perform individually or collectively any number of operations described herein. In some embodiments, the processor 702 may interpret and/or execute program instructions and/or process data stored in the memory 704, the data storage 706, or the memory 704 and the data storage 706. In some embodiments, the processor 702 may fetch program instructions from the data storage 706 and load the program instructions in the memory 704. After the program instructions are loaded into the memory 704, the processor 702 may execute the program instructions, such as instructions to perform one or more operations described with respect to the systems 100, 200, 300, and/or 400 of FIGS. 1-4 respectively. For example, the instructions may facilitate the identification of inputs in automated computer-program testing.

The memory 704 and the data storage 706 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 702. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 702 to perform a certain operation or group of operations. In these and other embodiments, the term "non-transitory" as explained herein should be construed to exclude only those types of transitory media that were found to fall outside the scope of patentable subject matter in the Federal Circuit decision of *In re Nuijten,* 500 F.3d 1346 (Fed. Cir. 7007). Combinations of the above may also be included within the scope of computer-readable media.

The communication unit 708 may be configured to receive computer-readable programs and/or inputs and to provide the computer-readable programs and/or inputs to the data storage 706. The communication unit 708 may be configured to receive records, data sets, and/or hypothetical data sets and to provide the records, data sets, and/or hypothetical data sets to the data storage 706. The communication unit 708 may include any device, system, component, or collection of components configured to allow or facilitate communication between the computing system 700 and a network. For example, the communication unit 708 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. The communication unit 708 may permit data to be exchanged with any such as a cellular network, a Wi-Fi network, a MAN, an optical network, etc., to name a few examples, and/or any other devices described in the present disclosure, including remote devices.

Modifications, additions, or omissions may be made to the computing system 700 without departing from the scope of the present disclosure. For example, the data storage 706 may be located in multiple locations and accessed by the processor 702 through a network.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." Additionally, use of the term "and/or" in some places does not mean that the term "or" should be understood to only include either of the terms as opposed to including the possibility of both terms.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method implemented by a computer system including at least a processor and memory-stored instructions, the instructions when executed by the processor, cause the computer system to perform operations, the operations comprising:

performing first fuzzing operations on a first set of inputs used during execution of a computer-readable program for testing of the computer-readable program;

performing second fuzzing operations on a second set of inputs used during execution of a computer-readable program for testing of the computer-readable program, wherein the second fuzzing operations identify inputs for inclusion in the second set of inputs differently than the first fuzzing operations identify inputs for inclusion in the first set of inputs and the first and second sets of inputs are different;

wherein the second fuzzing operations comprise:

obtaining a first input of the second set of inputs that is used during execution of the computer-readable program to cause the computer-readable program to take a first path during execution of the computer-readable program;

obtaining a second input of the second set of inputs that is used during execution of the computer-readable program to cause the computer-readable program to take a second path during execution of the computer-readable program;

identifying a sequence of values that is common to both the first input and the second input; and based on the sequence of values being common to both the first input and the second input, generating a third input for the second set of inputs that includes the sequence of values and a new value; and adjusting a ratio between a number of executions of the computer-readable program performed using the first set of inputs and a number of executions of the computer-readable program performed using the second set of inputs based on inputs in the first set of inputs, inputs in the second set of inputs, or the inputs in the first set of inputs and the inputs in the second set of inputs.

2. The method of claim 1, wherein the ratio is adjusted in response to a number of the inputs in the first set of inputs with a length greater than a length threshold, a number of the inputs in the second set of inputs with a length greater than the length threshold, or a number of the inputs in the first and second set of inputs with a length greater than the length threshold.

3. The method of claim 2, wherein the ratio is adjusted in response to the number of the inputs in the first set of inputs with a length greater than the length threshold, the number of the inputs in the second set of inputs with a length greater than the length threshold, or the number of the inputs in the first and second set of inputs with a length greater than the length threshold being greater than a queue threshold.

4. The method of claim 3, wherein the queue threshold is based on a total number of inputs in the first set of inputs, the second set of inputs, or the first and second set of inputs.

5. The method of claim 2, wherein the length threshold is based on an average length of the inputs in the first set of inputs, an average length of the inputs in the second set of inputs, or an average length of the inputs in the first and second set of inputs.

6. The method of claim 1, wherein the new value is mutated based on a previous input.

7. The method of claim 1, wherein the ratio is adjusted to increase the number of executions of the computer-readable program performed using the second set of inputs as compared to the number of executions of the computer-readable program performed using the first set of inputs in response to a number of inputs in the first set of inputs with a length greater than a length threshold being greater than a queue threshold, a number of inputs in the second set of inputs with a length greater than the length threshold being greater than the queue threshold, or a number of the inputs in the first and second set of inputs with a length greater than the length threshold being greater than the queue threshold.

8. The method of claim 1,
wherein the second fuzzing operations further comprise:
executing the computer-readable program using a third input from the second set of inputs;
tracking a given number of executions of a portion of code of the computer-readable program during the execution of the computer-readable program using the third input;
comparing the given number to a highest previous number of executions of the portion of code when executing the computer-readable program; and
in response to the given number being greater than the highest previous number of executions:
storing the given number as the highest previous number of executions; and
adding a modified version of the third input to the second set of inputs.

9. The method of claim 8, further comprising:
obtaining a control flow graph representing the computer-readable program;
obtaining traces indicating paths in the control flow graph taken during the first fuzzing operations and the second fuzzing operations; and
analyzing the traces and the control flow graph to determine a number of branches of the control flow graph that both satisfy a condition related to execution of the computer-readable program and are untraversed by the traces, wherein the adjusting the ratio is further based on the number of branches of the control flow graph that both satisfy the condition and are untraversed by the traces satisfying a trace threshold.

10. The method of claim 1, wherein the ratio is adjusted in response to a subset of inputs from the first set of inputs, from the second set of inputs, or from the first and second set of inputs including inputs that have a number of values and/or characters that are the same where the number is at least one-half of a total number of values and/or characters of an input in the subset of inputs.

11. A method implemented by a computer system including at least a processor and memory-stored instructions, the instructions when executed by the processor, cause the computer system to perform operations, the operations comprising:
performing first fuzzing operations on a first set of inputs used during execution of a computer-readable program for testing of the computer-readable program;
performing second fuzzing operations on a second set of inputs used during execution of a computer-readable program for testing of the computer-readable program, wherein the second fuzzing operations identify inputs for inclusion in the second set of inputs differently than the first fuzzing operations identify inputs for inclusion in the first set of inputs and the first and second sets of inputs are different;
wherein the second fuzzing operations comprise:
tracking a number of executions of a portion of code during the execution of the computer-readable program using a first input of the second set of inputs;
comparing the number of executions of the portion of code to a highest previous number of executions of the portion of code when executing the computer-readable program; and
in response to the number of executions being greater than the highest previous number of executions:
storing the number of executions as the highest previous number of executions; and
mutating the first input; and
adjusting a ratio between a number of executions of the computer-readable program performed using the first set of inputs and a number of executions of the computer-readable program performed using the second set of inputs based on inputs in the first set of inputs, inputs in the second set of inputs, or the inputs in the first set of inputs and the inputs in the second set of inputs.

12. The method of claim 11, wherein the ratio is adjusted in response to a number of the inputs in the first set of inputs with a length greater than a length threshold, a number of the inputs in the second set of inputs with a length greater than the length threshold, or a number of the inputs in the first and second set of inputs with a length greater than the length threshold.

13. The method of claim 12, wherein the length threshold is based on an average length of the inputs in the first set of inputs, an average length of the inputs in the second set of inputs, or an average length of the inputs in the first and second set of inputs.

14. The method of claim 12, wherein the mutating the first input comprises at least one of:
randomly flipping one or more bits within the first input;
randomly repeating one or more values within the first input;
randomly removing one or more values from the first input; and randomly adding values from another input into the first input.

15. The method of claim 11, further comprising:
obtaining a control flow graph representing the computer-readable program;
obtaining traces indicating paths in the control flow graph taken by the computer-readable program during the first fuzzing operations and the second fuzzing operations; and
analyzing the traces and the control flow graph to determine a number of branches of the control flow graph that both satisfy a condition related to execution of the computer-readable program and are untraversed by the traces,
wherein the adjusting the ratio is further based on the number of branches of the control flow graph that both satisfy the condition and are untraversed by the traces satisfying a trace threshold.

16. The method of claim 15, wherein the condition is satisfied by a branch of the control flow graph that corresponds to a second portion of code that is executed more than once during an execution of the branch.

17. The method of claim 11, wherein the ratio is adjusted in response to a subset of inputs from the first set of inputs, from the second set of inputs, or from the first and second set of inputs including inputs that have a number of values and/or characters that are the same where the number is at least one-half of a total number of values and/or characters of an input in the subset of inputs.

18. The method of claim 11, further comprising storing an eight-bit number representing the highest previous number of executions of the portion of code.

19. The method of claim 11, wherein the second fuzzing operations further comprise:
obtaining a second input of the second set of inputs that is used during execution of the computer-readable program to cause the computer-readable program to take a first path during execution of the computer-readable program;
obtaining a third input of the second set of inputs that is used during execution of the computer-readable program to cause the computer-readable program to take a second path during execution of the computer-readable program;
identifying a sequence of values that is common to both the second input and the third input; and
based on the sequence of values being common to both the second input and the third input, generating a fourth input for the second set of inputs that includes the sequence of values and a new value.

20. A method implemented by a computer system including at least a processor and memory-stored instructions, the instructions when executed by the processor, cause the computer system to perform operations, the operations comprising:
performing first fuzzing operations on a first set of inputs used during execution of a computer-readable program for testing of the computer-readable program;
performing second fuzzing operations on a second set of inputs used during execution of a computer-readable program for testing of the computer-readable program, wherein the second fuzzing operations identify inputs for inclusion in the second set of inputs differently than the first fuzzing operations identify inputs for inclusion in the first set of inputs and the first and second sets of inputs are different;
obtaining a control flow graph representing the computer-readable program;
obtaining traces indicating paths in the control flow graph taken by the computer-readable program during the first fuzzing operations and the second fuzzing operations;
analyzing the traces and the control flow graph to determine a number of branches of the control flow graph that both satisfy a condition related to execution of the computer-readable program and are untraversed by the traces; and
in response to the number of branches of the control flow graph that both satisfy the condition and are untraversed by the traces satisfying a trace threshold adjusting a ratio between a number of executions of the computer-readable program performed using the first set of inputs and a number of executions of the computer-readable program performed using the second set of inputs.

* * * * *